United States Patent
Redhead et al.

(10) Patent No.: US 7,038,417 B1
(45) Date of Patent: May 2, 2006

(54) CURRENT CONTROL LOOP BIAS CALIBRATION BY INTEGRATION

(75) Inventors: Kempton William Redhead, Fountain Valley, CA (US); David James Brecht, Newport Beach, CA (US)

(73) Assignee: Certance LLC, Costa Mesa, CA (US)

( * ) Notice: Subject to any disclaimer, the term of this patent is extended or adjusted under 35 U.S.C. 154(b) by 0 days.

(21) Appl. No.: 11/065,705

(22) Filed: Feb. 23, 2005

(51) Int. Cl.
*G11B 5/02* (2006.01)

(52) U.S. Cl. .................. 318/560; 318/561; 360/67

(58) Field of Classification Search ........ 318/560–566, 318/603–610, 630, 632, 138, 254, 439; 360/67, 360/78.09, 64, 66
See application file for complete search history.

(56) References Cited

U.S. PATENT DOCUMENTS

| | | | | |
|---|---|---|---|---|
| 5,583,420 A | * | 12/1996 | Rice et al. ................ | 322/25 |
| 5,872,674 A | * | 2/1999 | Eddy ..................... | 360/78.09 |
| 6,252,735 B1 | * | 6/2001 | Chung et al. .............. | 360/67 |
| 6,304,472 B1 | * | 10/2001 | Nagasu et al. ............ | 363/97 |
| 6,420,910 B1 | * | 7/2002 | Contreras et al. ......... | 327/77 |
| 6,476,602 B1 | * | 11/2002 | Gray ..................... | 324/210 |
| 2004/0179829 A1 | * | 9/2004 | Phillips et al. .......... | 388/804 |

* cited by examiner

*Primary Examiner*—Paul Ip
(74) *Attorney, Agent, or Firm*—Thelen Reid & Priest LLP

(57) ABSTRACT

Ascertaining through integration a bias calibration level for a current control loop of a driver motor of a tape drive. The driver motor includes a current controller having as inputs a demand signal, a bias signal, and a feedback signal. The current controller includes an integrator coupled to the output. The method includes setting the demand signal to a zero current level, setting the bias signal to a level that substantially prevents the integrator from driving itself high, stepping down the bias signal to form a stepped down bias signal, measuring a sense parameter at the output of the current controller, determining whether the sense parameter is high for the stepped down bias signal, and setting the bias calibration level to a level sufficiently above the stepped down bias signal such that the integrator is not driven high when the demand signal is set to the zero current level.

20 Claims, 3 Drawing Sheets

CURRENT CONTROL LOOP BIAS CALIBRATION BY INTEGRATION

FIELD OF THE INVENTION

The present invention relates generally to control of electric motors. More specifically, the present invention relates to calibration of a current control loop for a motor using integration.

BACKGROUND OF THE INVENTION

Electric motors are employed in some very precise applications. One example is as a drive motor in a tape drive. There are any number of tape drives that are commonly used. A typical tape drive includes two reel assemblies. A first reel assembly consists of a removable cartridge that is loaded into the tape drive. The first reel holds a length of tape. A first drive motor is coupled to the first reel. The second reel assembly is often permanently mounted in the tape drive and is connected to a second drive motor. The tape from the first reel is threaded onto the second reel and the two drive motors work together to shuttle the tape back and forth between the two reels. Many operating parameters of the drive motors should be tightly monitored or controlled. Among these parameters, depending on the application, might be the speed and start/stop regulation.

A drive motor may contain any number of electrical components including the motor itself. Some of the components may be in the form of an Integrated Circuit (IC) such as an Application Specific Integrated Circuit (ASIC) and some of the components may be in the form of discrete electrical components such as resistors, capacitors, and Operational Amplifiers (op amps). The exact combination of components and the values for those components may depend on various factors such as operational environment and designer preference. Each of the components will have various design and manufacturing tolerances. To assure proper operation of the drive motor, such tolerances should be accounted for. In practice, this might be accomplished in one or more steps during manufacturing of the drive motor. For example, one or more operational parameters can be calibrated to fall within a suitable range. Various adjustments are made to fine tune operation of the drive motor to achieve accurate calibration. The drive motor may or may not be calibrated several times over its useful life.

BRIEF SUMMARY OF THE INVENTION

Ascertaining through integration a bias calibration level for a current control loop of a driver motor of a tape drive is disclosed. The driver motor includes a current controller having as inputs a demand signal, a bias signal, and a feedback signal. The current controller includes an integrator coupled to the output. The method includes setting the demand signal to a zero current level, setting the bias signal to a level that substantially prevents the integrator from driving its output toward the positive voltage direction, stepping down the bias signal to form a stepped down bias signal, measuring a sense parameter at the output of the current controller, determining whether the sense parameter is high for the stepped down bias signal, and setting the bias calibration level to a level sufficiently above the stepped down bias signal such that the integrator is not driving its output toward the positive voltage direction when the demand signal is set to the zero current level.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION OF THE INVENTION

Various exemplary embodiments of the present invention are described herein in the context of a method and apparatus for current control loop bias calibration by integration. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
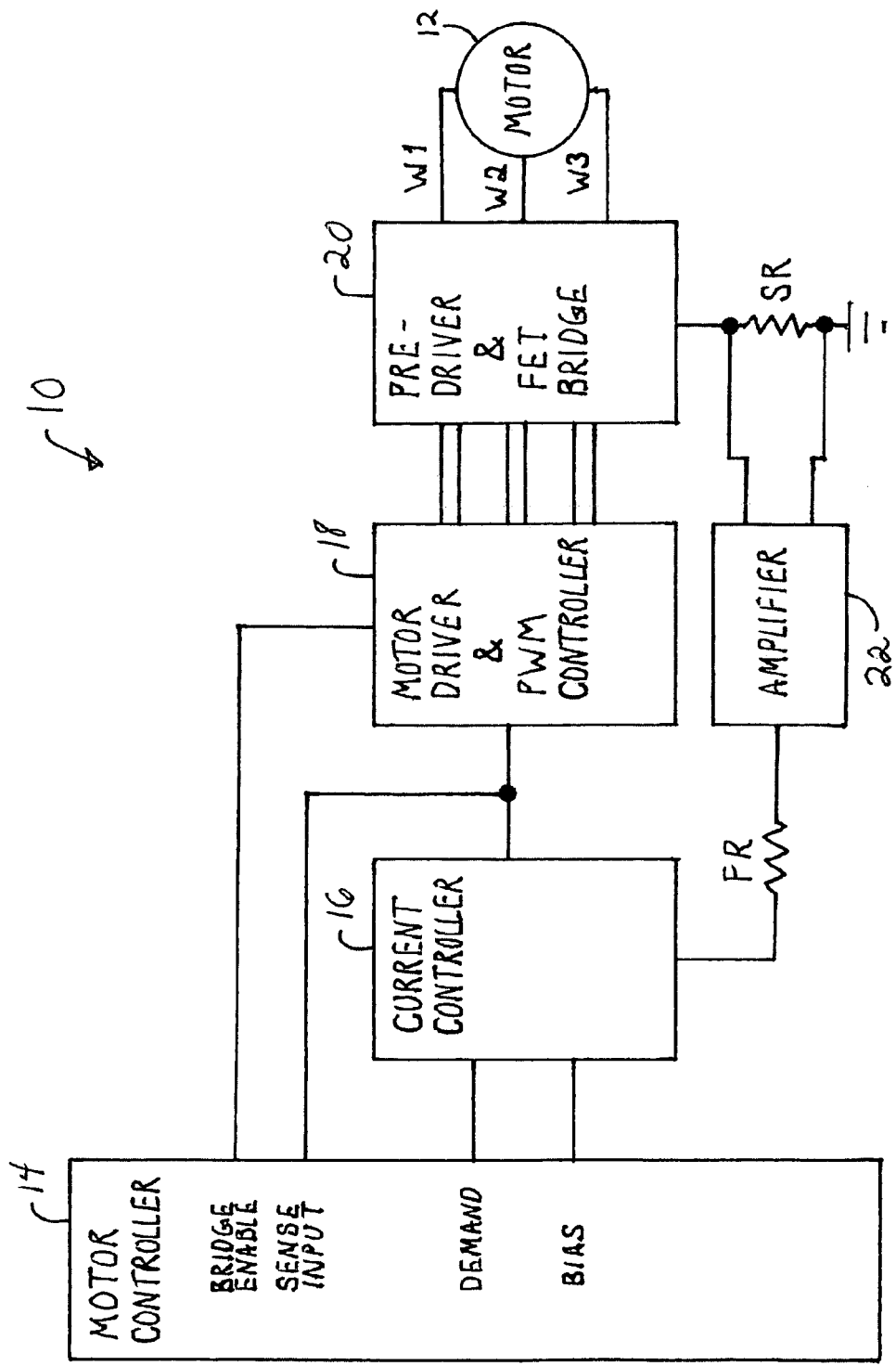
FIG. 1 is a block diagram of an embodiment of a drive motor according to the present invention.

Turning first to FIG. 1, a block diagram of an embodiment of a drive motor 10 according to the present invention is shown. In the interest of clarity, some of the elements of the drive motor 10 have been simplified and not all of the possible or necessary elements may be shown. The combination of elements may not be strictly as shown while nevertheless remaining within the inventive concept disclosed herein. The drive motor 10 includes a motor 12 which in this embodiment is a 3-phase brushless DC motor. Other motors are possible. Coupled to the motor 12 are various elements that make up a current control loop that drives and regulates the operation of the motor 12. The drive motor 10 includes a motor controller 14, a current controller 16, a motor driver and Pulse Width Modulator (PWM) controller 18, a pre-driver and Field Effect Transistor (FET) bridge 20, a sense resistor SR, an amplifier 22, and a feedback resistor FR. The motor controller 14 includes most of the logic processing capability of the motor driver 10. The motor controller 14 performs multiple functions and in this embodiment is shown as an ASIC. Not all of the functions are shown and other physical embodiments are possible. Among the functions shown is a demand output that requests a torque from the motor 12 and a bias output that establishes a voltage level for the current controller 16. Two optional functions that are shown are a bridge enable output that enables the motor driver 18 and a sense input that may be used in the calibration process to be described below. The motor driver 18, the pre-driver 20, and the amplifier 22 may be of conventional design.

A brief description of the current control loop operation will now be given. The relative logic/voltage levels described are for demonstration purposes only. Other levels could be similarly employed. It is assumed initially that the motor 12 is stopped and that the bias signal is set to a predetermined constant level. No current should be flowing out of the current controller 16 at this time. Motion of the motor 12 starts with a request for torque through the demand signal from the motor controller 14. An increase in the demand signal results in an increase in the output signal of the current controller 16. This signal is driven into the motor driver 18 that generates logic that is in turn driven into the pre-driver 20. The result is an on duty ratio that is proportional to the output of the current controller 16. The pre-driver 20 sends current through two of the three windings of the motor 12 and out through the sense resistor. A voltage across the sense resistor is amplified in the amplifier 22 and passed back through the feedback resistor to the current controller 16. The feedback signal closes the control loop and provides stable and accurate control of the current passing through the motor 12. This helps to assure proper operation of the drive motor 10.

Figure 2:
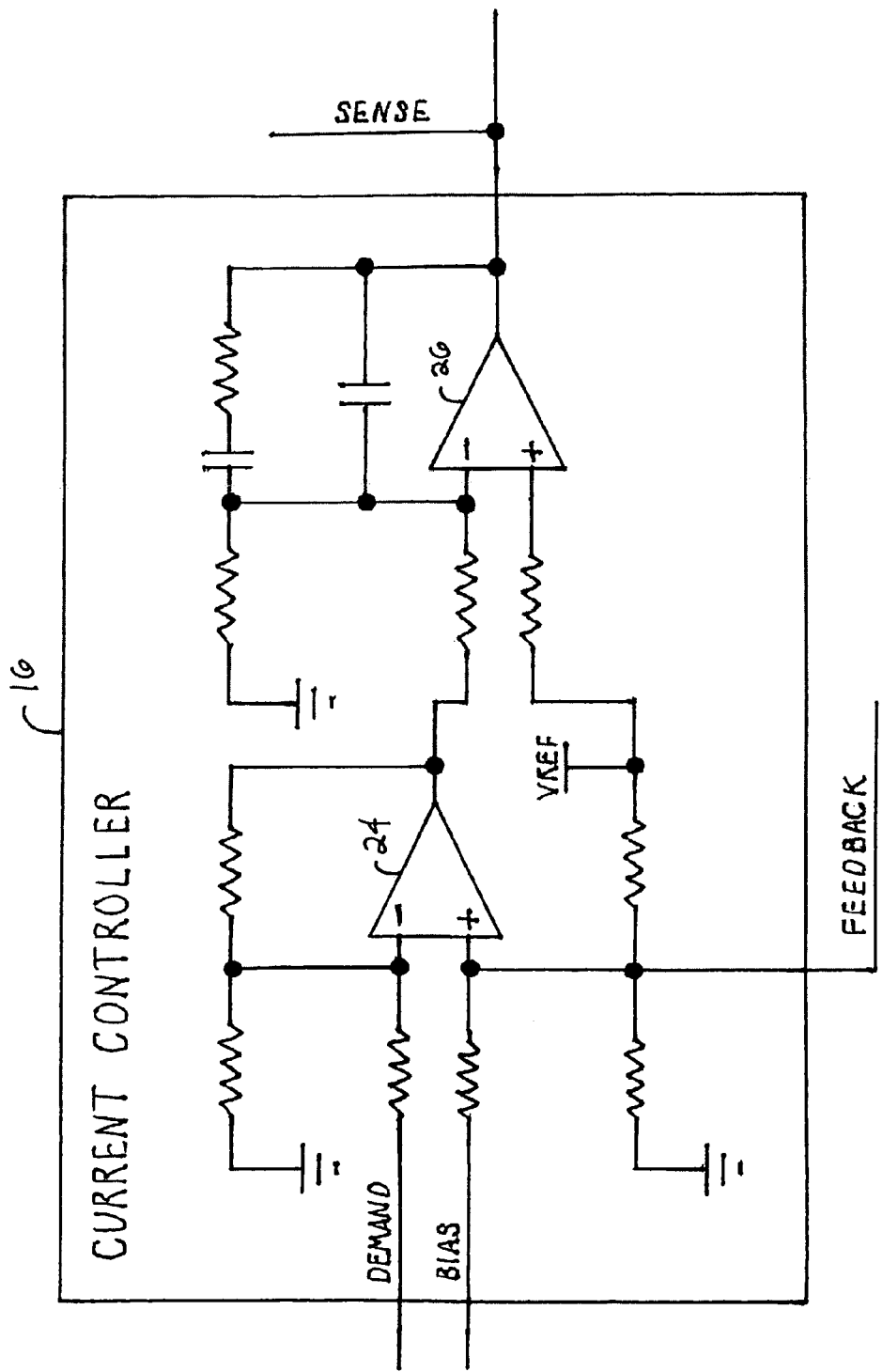
FIG. 2 is a schematic wiring diagram according to the present invention of one embodiment of the current controller of FIG. 1.

Turning now to FIG. 2, a schematic wiring diagram according to the present invention of one embodiment of the current controller 16 of FIG. 1 is shown. The current controller 16 includes a first op amp 24 and a second op amp 26 connected to various resistors, capacitors, and reference voltages as shown. The values of the various elements will depend on the circumstances. One of ordinary skill in the art will recognize that the capacitance in the feedback path of the second op amp 26 makes that op amp perform as an integrator. Thus the second op amp 26 may be referred to as the integrator 26. The corresponding demand, bias, sense, and feedback signal lines from FIG. 1 have been labeled for quick reference. Of course, the sense line could just as easily originate inside the current controller 16 as outside as shown. Although not shown, the sense line may include signal processing elements such as an analog-to-digital converter, a logic level voltage detector, high versus low voltage detection apparatus, and the like.

Recall that in order to operate the motor 12 of FIG. 1, the bias signal is set to a constant level and the demand signal is varied. In the embodiment shown, an increase in the demand signal results in an increase of the output level of the first op amp 24 and vice versa. When the level at the negative input of the integrator 26 is greater than the level at the positive input, the output of the integrator 26 decreases and vice versa. Through operation of the current control feedback loop described above, the feedback signal modifies the level at the positive input of the first op amp 24 to stabilize the output of the current controller 16. In the embodiment shown, the various elements are discrete components connected together on a printed circuit board. Each component has its own manufacturing tolerance. Taken together, these may create one of two irregularities in the operation of the drive motor 10 of FIG. 1. First, the operating range may be too low, that is, the lower and upper limits of the actual operation fall below the lower and upper limits of the desired operation, respectively. Second, the operating range may be too high, that is, the lower and upper limits of the desired operation fall below the lower and upper limits of the actual operation, respectively. The result may be inaccurate motor torque control and non-linearities in the controlled response of the drive motor 10. Since during manufacturing of the drive motor 10 each assembly will vary differently, each may have to be individually calibrated to account for the various tolerances.

Figure 3:
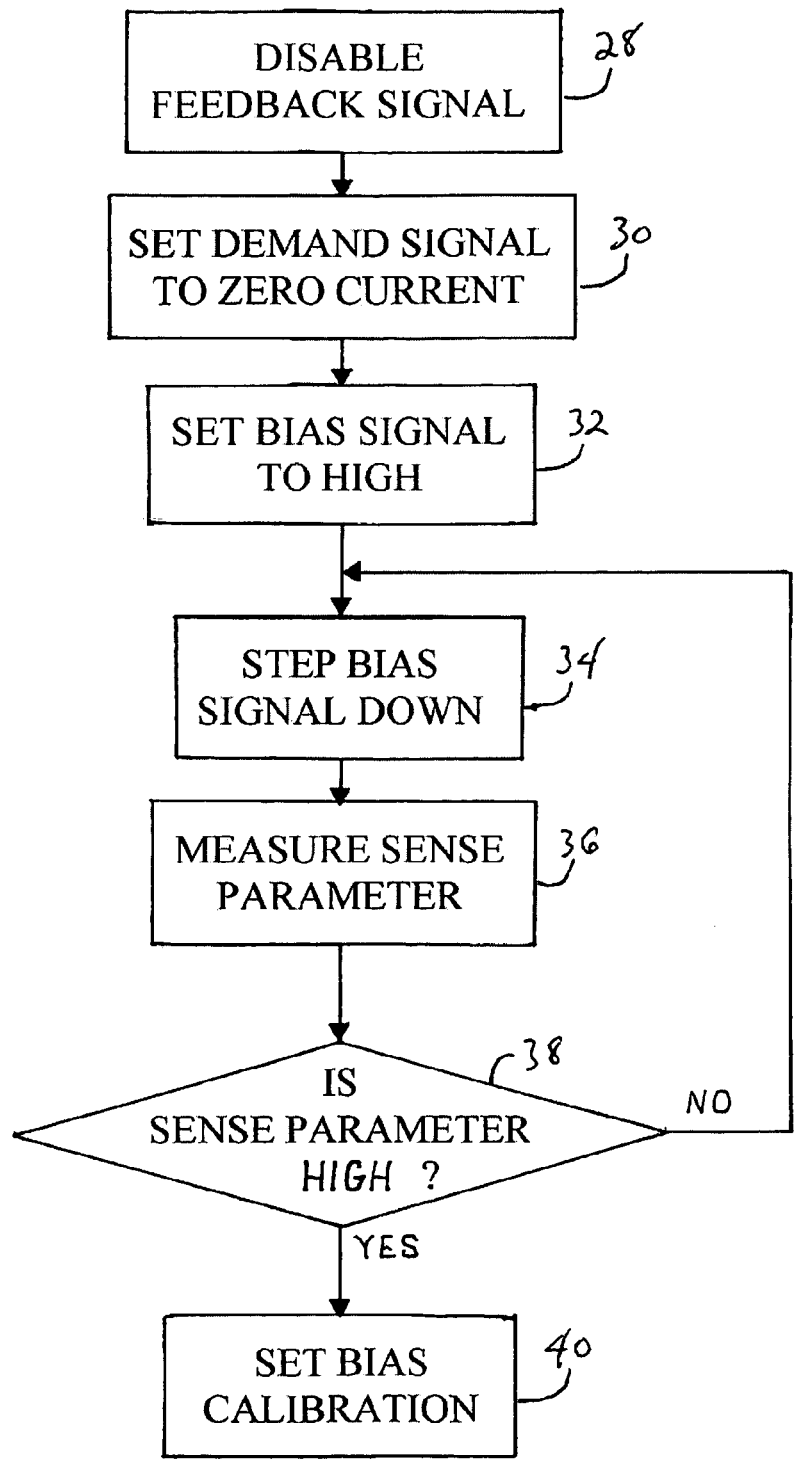
FIG. 3 is a flow diagram according to the present invention of the current control loop bias calibration by integration.

Turning now to FIG. 3, a flow diagram according to the present invention of the current control loop bias calibration by integration is shown. The order of the blocks may not be exactly as shown with blocks being deleted or added. At block 28, the feedback signal is disabled. This may be accomplished in several ways. The intent during calibration is to allow the integrator 26 of FIG. 2 to perform substantially unrestrained. Theoretically, the integrator 26 will respond over time to any difference between the inputs by growing the output voltage until a voltage limit is reached. The feedback signal is meant to regulate this during normal operation. The integrator 26 is designed to withstand the calibration procedure without damage. The same care should also be taken to protect the elements of FIG. 1 that are connected to the current controller 16. Both protection and feedback signal disabling may be accomplished together. For example, it would be possible to calibrate the current controller 16 before it is even connected to the motor driver 18 of FIG. 1. Alternatively, a bridge enable signal may be used to disable the motor driver 18. Other isolation methods may be similarly employed. At block 30, the demand signal is set to the zero current level. The actual value will depend on the circumstances, but the level is that which the motor driver 10 of FIG. 1 uses to request no movement from the motor 12 of FIG. 1. At block 32, the bias signal is set to a high level. Again the actual value will depend on the circumstances, but the level is somewhere above the level that it takes to prevent the integrator 26 from operating with its output above its maximum voltage level. The high level may be a predetermined level or it may be individually established in each case. At block 34, the bias signal is stepped down. The size of the step may depend on the circumstances and may influence the accuracy of the calibration results. At block 36, a sense parameter is measured. The sense parameter may be a voltage or a current. At block 38, a determination is made as to whether the sense parameter is high. As the bias signal is stepped down, at some point a voltage difference will appear at the input of the integrator 26 such that the voltage at the negative input is greater than the voltage at the positive input. At this point, the integrator 26 will grow the output as described above. This is at or near the bias signal level that the calibration process is attempting to ascertain. The sense parameter is selected to indicate when the output of the integrator 26 is growing. When the determination is made that the sense parameter is not high, that is, low, then the process returns to block 34 and another step down in the bias signal is made. When the determination is made that the sense parameter is high, then the process continues with block 40. At block 40, the bias calibration level is set to a level sufficiently above the level identified in block 38 so that the integrator 26 is off. One choice would be the previous step up in the bias signal. It may be desired or required to test the bias calibration level to be certain that the integrator 26 is off. The selected bias calibration level should substantially account for the variation in tolerances of the current controller 16 thus bringing the actual operating range at least closer to the desired operating range. Other compensation techniques may be used in addition as desired or required.

As a further refinement of FIG. 3, it is possible to use one size of step in block 34 for stepping down the bias signal until a high result is found in block 38 as above. Then the bias signal level can be raised again to at least one step higher and a second smaller step size can be used to more gradually step down the bias signal until a high result is found once more. Such an iterative approach could be repeated with successively smaller step sizes until the desired degree of accuracy for the calibration process is achieved. The calibration test designer may have to balance accuracy against speed.

In the embodiment exhibited in FIG. 1, the sense input line is shown to connect to the motor controller 14 of FIG. 1. This allows the calibration process to be internally controlled. This would not necessarily be the case however. It would also be possible for an external testing mechanism to be employed or some combination of both.

In an application where more than one drive motor is being used in the same device, such as the tape drive described above, it may be possible to use some of the calibration resources for both of the drive motors. For example, the sense input line could be used for both of the drive motors by isolating one of the drive motors while the other is being calibrated and vice versa. Some isolation hardware or logic may be necessary. The calibration test designer may have to balance hardware design and cost against test routine complexity and speed.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for ascertaining through integration a bias calibration level for a current control loop of a driver motor, the driver motor includes a current controller having as inputs a demand signal, a bias signal, and a feedback signal, the current controller includes an integrator having an output that is coupled to the output of the current controller, the method comprises:

setting the demand signal to a zero current level;

setting the bias signal to a level that substantially prevents the integrator from driving the output toward the positive voltage direction;

stepping down the bias signal by an amount quantified by a step size to form a stepped down bias signal;

measuring a sense parameter at the output of the current controller;

determining whether the sense parameter is high for the stepped down bias signal; and when the determination is made that the sense parameter is high, setting the bias calibration level to a level sufficiently above the stepped down bias signal such that the integrator is not driving the output toward the positive voltage direction when the demand signal is set to the zero current level.

2. The method as defined in claim 1, further comprising when the determination is made that the sense parameter is not high, repeating the steps of stepping down, measuring, and determining until a high determination is reached.

3. The method as defined in claim 1, further comprising disabling the feedback signal prior to the step of stepping down the bias signal.

4. The method as defined in claim 3, wherein the step of disabling comprises isolating the current controller.

5. An apparatus for ascertaining through integration a bias calibration level for a current control loop of a driver motor, the driver motor includes a current controller having as inputs a demand signal, a bias signal, and a feedback signal, the current controller includes an integrator having an output that is coupled to the output of the current controller, the apparatus comprises:

means for setting the demand signal to a zero current level;

means for setting the bias signal to a level that substantially prevents the integrator from driving the output toward the positive voltage direction;

means for stepping down the bias signal by an amount quantified by a step size to form a stepped down bias signal;

means for measuring a sense parameter at the output of the current controller;

means for determining whether the sense parameter is high for the stepped down bias signal; and when the determination is made that the sense parameter is high, means for setting the bias calibration level to a level sufficiently above the stepped down bias signal such that the integrator is not driving the output toward the positive voltage direction when the demand signal is set to the zero current level.

6. The apparatus as defined in claim 5, further comprising means for disabling the feedback signal.

7. The apparatus as defined in claim 6, wherein the means for disabling comprises means for isolating the current controller.

8. A method for ascertaining through integration at least one bias calibration level for a tape drive, the tape drive includes a motor controller, a first current controller, and a second motor controller, the motor controller includes a sense input, a first demand output, a first bias output, a second demand output, and a second bias output, the first current controller includes a demand input coupled to the first demand output, a bias input coupled to the first bias output, a feedback input, an output coupled to the sense input, and an integrator having an output coupled to the output of the first current controller, the second current controller includes a demand input coupled to the second demand output, a bias input coupled to the second bias output, a feedback input, an output coupled to the sense input, and an integrator having an output coupled to the output of the second current controller, the method comprises:

isolating the second current controller from the sense input;

setting the first demand output to a zero current level;

setting the first bias output to a level that substantially prevents the integrator of the first current controller from driving the output toward the positive voltage direction;

stepping down the first bias output by an amount quantified by a step size to form a stepped down bias output;

measuring a sense parameter at the sense input;

determining whether the sense parameter is high for the stepped down bias output; and when the determination is made that the sense parameter is high, setting a first bias calibration level to a level sufficiently above the stepped down bias signal such that the integrator of the first current controller is not driving the output toward the positive voltage direction when the first demand output is set to the zero current level.

9. The method as defined in claim 8, further comprising when the determination is made that the sense parameter is not high, repeating the steps of stepping down, measuring, and determining until a high determination is reached.

10. The method as defined in claim 8, further comprising disabling the feedback input of the first current controller prior to the step of stepping down the bias output.

11. The method as defined in claim 8, further comprising:
isolating the first current controller from the sense input;
setting the second demand output to a zero current level;
setting the second bias output to a level that substantially prevents the integrator of the second current controller from driving the output toward the positive voltage direction;
stepping down the second bias output by an amount quantified by a step size to form a stepped down bias output;
measuring a sense parameter at the sense input;
determining whether the sense parameter is high for the stepped down bias output; and
when the determination is made that the sense parameter is high, setting a second bias calibration level to a level sufficiently above the stepped down bias signal such that the integrator of the second current controller is not driving the output toward the positive voltage direction when the second demand output is set to the zero current level.

12. The method as defined in claim 11, further comprising when the determination is made that the sense parameter is not high, repeating the steps of stepping down, measuring, and determining until a high determination is reached.

13. The method as defined in claim 11, further comprising disabling the feedback input of the second current controller prior to the step of stepping down the bias output.

14. An apparatus for ascertaining through integration at least one bias calibration level for a tape drive, the tape drive includes a motor controller, a first current controller, and a second motor controller, the motor controller includes a sense input, a first demand output, a first bias output, a second demand output, and a second bias output, the first current controller includes a demand input coupled to the first demand output, a bias input coupled to the first bias output, a feedback input, an output coupled to the sense input, and an integrator having an output coupled to the output of the first current controller, the second current controller includes a demand input coupled to the second demand output, a bias input coupled to the second bias output, a feedback input, an output coupled to the sense input, and an integrator having an output coupled to the output of the second current controller, the apparatus comprises:
means for isolating the second current controller from the sense input;
means for setting the first demand output to a zero current level;
means for setting the first bias output to a level that substantially prevents the integrator of the first current controller from driving the output toward the positive voltage direction;
means for stepping down the first bias output by an amount quantified by a step size to form a stepped down bias output;
means for measuring a sense parameter at the sense input;
means for determining whether the sense parameter is high for the stepped down bias output; and
when the determination is made that the sense parameter is high, means for setting a first bias calibration level to a level sufficiently above the stepped down bias signal such that the integrator of the first current controller is not driving the output toward the positive voltage direction when the first demand output is set to the zero current level.

15. The apparatus as defined in claim 14, further comprising means for disabling the feedback input of the first current controller.

16. The apparatus as defined in claim 14, further comprising:
means for isolating the first current controller from the sense input;
means for setting the second demand output to a zero current level;
means for setting the second bias output to a level that substantially prevents the integrator of the second current controller from driving the output toward the positive voltage direction;
means for stepping down the second bias output by an amount quantified by a step size to form a stepped down bias output;
means for measuring a sense parameter at the sense input;
means for determining whether the sense parameter is high for the stepped down bias output; and
when the determination is made that the sense parameter is high, means for setting a second bias calibration level to a level sufficiently above the stepped down bias signal such that the integrator of the second current controller is not driving the output toward the positive voltage direction when the second demand output is set to the zero current level.

17. The apparatus as defined in claim 16, further comprising means for disabling the feedback input of the second current controller prior to the step of stepping down the bias output.

18. A tape drive enabled to ascertain through integration at least one bias calibration level for a current control loop of the tape drive, the tape drive comprises:
a motor controller including a sense input, a first demand output, and a first bias output; and
a first current controller including a demand input coupled to the first demand output, a bias input coupled to the first bias output, an output coupled to the sense input, and an integrator having an output coupled to the output of the first current controller,
wherein the sense input is utilized during a calibration sequence to ascertain a first bias calibration level for the first current controller where the integrator of the first current controller is not driving the output toward the positive voltage direction when the first demand output is set to a zero current level and the first bias output is set to the first bias calibration level.

19. The tape drive as defined in claim 18, wherein the motor controller further includes a second demand output and a second bias output and the tape drive further comprises:
a second current controller including a demand input coupled to the second demand output, a bias input coupled to the second bias output, an output coupled to the sense input, and an integrator having an output coupled to the output of the second current controller, wherein the sense input is utilized during a calibration sequence to ascertain a second bias calibration level for the second current controller where the integrator of the second current controller is not driving the output toward the positive voltage direction when the second demand output is set to a zero current level and the second bias output is set to the second bias calibration level.

20. The tape drive as defined in claim 18, further comprising a signal processor connected in series with the sense input of the motor controller.

* * * * *